United States Patent
Jones et al.

[11] 3,884,904
[45] May 20, 1975

[54] 11-SUBSTITUTED ERYTHROMYCIN B DERIVATIVES

[75] Inventors: Peter Hadley Jones, Lake Forest; James Bruce McAlpine, Libertyville; Jeanne Marie Pauvlik, Waukegan; Thomas John Perun, Libertyville, all of Ill.

[73] Assignee: Abbott Laboratories, North Chicago, Ill.

[22] Filed: June 21, 1973

[21] Appl. No.: 372,386

[52] U.S. Cl. .............................. 260/210 E; 424/180
[51] Int. Cl. .......................................... C07c 129/18
[58] Field of Search ..................... 260/210 E, 210.5

[56] References Cited
UNITED STATES PATENTS

| | | | |
|---|---|---|---|
| 3,417,077 | 12/1968 | Murphy et al. | 260/210 E |
| 3,701,770 | 10/1972 | Jones et al. | 260/210 E |
| 3,736,313 | 5/1973 | Jones et al. | 260/210 E |

Primary Examiner—Johnnie R. Brown
Assistant Examiner—Cary B. Owens
Attorney, Agent, or Firm—Robert L. Niblack

[57] ABSTRACT

Covers 11-substituted erythromycin B derivatives having a formula selected from the group consisting of:

Formula I

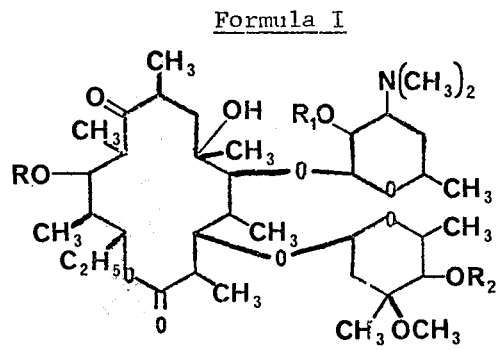

where R is selected from the group consisting of lower alkyl and —$CHR_3SR_4$ where $R_3$ and $R_4$ are loweralkyl, and $R_1$ and $R_2$ are hydrogen or loweralkyl and;

Formula II

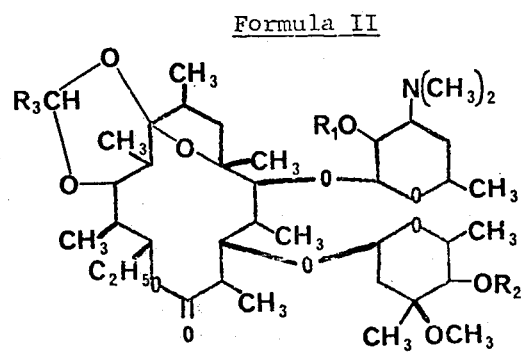

where $R_1$, $R_2$ and $R_3$ are as before defined.

Said erythromycin derivatives are useful as antibiotics or as intermediates useful in preparing other useful antibiotic compounds.

5 Claims, No Drawings

11-SUBSTITUTED ERYTHROMYCIN B DERIVATIVES

DESCRIPTION OF THE INVENTION

This invention relates to 11-substituted erythromycin derivatives which are useful as antibiotics or as intermediates in preparing other useful antibiotic compounds.

Erythromycin is produced in two forms denoted A and B by cultivating a strain of *Streptomyces erythreus* in a suitable nutrient medium as taught in U.S. Pat. No. 2,653,899, Bunch, et al. The structure of erythromycin is represented by the following formula:

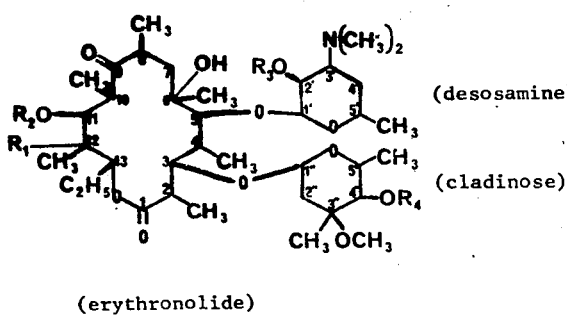

(erythronolide)

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

In order to prepare the erythromycin derivatives here one may start with either 4″ loweralkanoyl erythromycin B or 2′, 4″ diloweralkanoyl erythromycin B. The 2′, 4″ diloweralkanoyl, 11-O-α-dialkylsulfide erythromycin B group of derivatives are then formed by reacting a dialkyl sulfoxide with one of the above erythromycins in the presence of a lower acid anhydride. This product in turn may be treated with a lower alcohol to produce the 11-O-α-dialkylsulfide erythromycin B derivatives. The lower alcohol acts to remove the alkanoyl groups. The 11-O-α-dialkylsulfide erythromycin B derivative is then reduced with an appropriate reducing agent such as Raney Nickel to produce a mixture of the cyclic acetal of erythromycin B and the 11-alkoxy erythromycin B derivative. These are then separated from one another.

In order to produce the cyclic acetal erythromycin derivative free of admixture with 11-O-alkyl erythromycin B, an 11-O-α-dialkylsulfide erythromycin B derivative is reacted with mercuric chloride - mercuric oxide.

The following examples illustrate fully the preparation of the derivatives of the invention:

Example I

2′-O-Acetyl-4″-O-formyl-11-O-methylthiomethyl erythromycin B

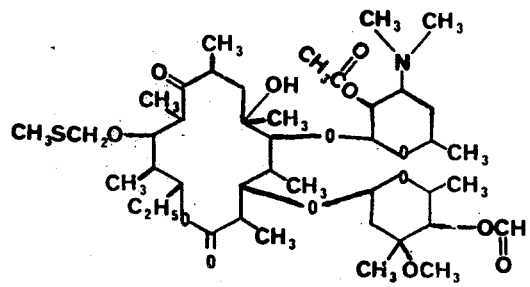

4″-O-Formyl erythromycin B (2.0 g., 2.7 mmoles.) was combined with 20 ml. of dimethylsulfoxide and 14 ml. of acetic anhydride and allowed to stand overnight. The mixture was then poured into cold, 10% sodium carbonate and extracted three times with chloroform. The combined chloroform extracts were washed once with 5% sodium bicarbonate and once with water. After drying over sodium sulfate, solvent was removed to give 2.32 g. of crude product, shown by NMR and TLC to be the desired product.

A sample was chromatographed on Sephadex LH-20 in chloroform-hexane 1:1. The peak fractions were combined, concentrated and the residue was recrystallized from benzenehexane mixtures to give 2′-O-acetyl-4″-O-formyl-11-O-methyl-thiomethyl erythromycin B containing one molecule of dimethylsulfoxide of crystallization as evidenced by NMR and microanalysis.

The product analyzed as follows:

Analysis calculated for $C_{42}H_{73}NO_{14}S - C_2H_6SO -$ M.W. = 926.1; M.P. = 127° C.

| Microanalysis | Theory | Found |
|---|---|---|
| C | 57.0 | 56.7 |
| H | 8.6 | 8.8 |
| N | 1.5 | 1.3 |
| O | 25.9 | 26.0 |
| S | 6.9 | 6.6 |

Example II

11-O-Methylthiomethyl erythromycin B

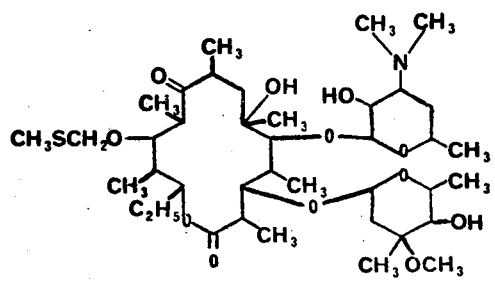

2'-O-Acetyl-4''-O-formyl-11-O-methylthiomethyl erythromycin B from Example I was dissolved in 100 ml. of methanol. To this solution was added 50 ml. of 5% sodium bicarbonate, and the mixture was stirred for 24 hours. Some methanol was removed under vacuum on the rotary evaporator, water was added to the mixture, and the mixture was extracted three times with chloroform. The combined chloroform extracts were washed with water, dried over sodium sulfate, and solvent was removed to give 2.06 g. of crude product, shown by NMR and TLC to be desired product.

A sample recrystallized from ethanol had an M.P. of 101° – 103° C.

Analysis calculated for: $C_{39}H_{71}NO_{12}S$, M.W. = 778.065

| Microanalysis | Theory | Found |
|---|---|---|
| C | 60.2 | 60.0 |
| H | 9.2 | 9.4 |
| N | 1.8 | 1.7 |
| O | 24.7 | 24.6 |
| S | 4.1 | 4.1 |

Example III 9,11-O-Methylene erythromycin B-6,9-hemiacetal

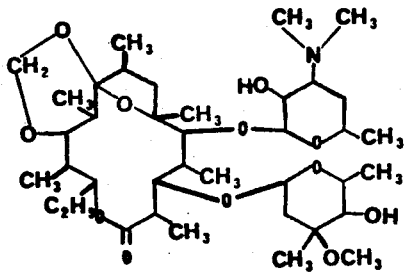

11-O-Methylthiomethyl erythromycin B (1.0 g., 1.4 mmoles.) was dissolved in a solution of 1.0 ml. of water and 30.0 ml. of acetone. When all of the 11-O-methylthiomethyl erythromycin B had dissolved, 1.0 g. of mercuric oxide and 1.5 g. of mercuric chloride were added and the resulting mixture was stirred for 3 hours. After stirring, the mixture was filtered and the filtrate was extracted three times with chloroform. The combined chloroform extracts were washed once with 5% sodium bicarbonate and once with water. After drying over sodium sulfate, solvent was removed on the rotary evaporator to give 1.16 g. of product. This product was treated with methanol — 5% sodium bicarbonate for several days and then extracted three times with chloroform. The combined chloroform extracts were washed with water, dried over sodium sulfate, and solvent was removed to give 0.97 g. of product. Crystallization from methanol-water gave 360 mg. (35%) of clean, white crystalline product (one spot on TLC).

The product analyzed as follows:

Analysis calculated for: $C_{38}H_{67}NO_{12}$, M.W. = 729.96; M.P. = 185° – 186° C.

| Microanalysis | Theory | Found |
|---|---|---|
| C | 62.53 | 62.73 |
| H | 9.25 | 9.59 |
| N | 1.92 | 1.98 |
| O | 26.30 | 26.84 |

Example IV

11-O-Methyl erythromycin B

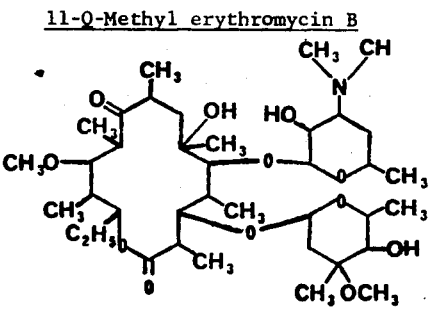

11-O-Methylthiomethyl erythromycin B (1.089 g.) in ethanol (100 ml.) was treated with 30 ml. of a thick ethanol suspension of Raney Nickel and the mixture was heated under reflux for 75 minutes then allowed to cool and filtered. The filtrate was concentrated and the residue was passed through a counter current distributor charged with the lower (stationary) and upper (mobile) phase from n-heptane (25 parts), benzene (50 parts), acetone (15 parts), isopropanol (10 parts), aqueous potassium phosphate buffer (pH 7.0, 0.01 M in $PO_4 \equiv$ ) (25 parts). Upper phases were removed and collected after 200 transfers. Initial fractions collected contained 9,11-O-methylene erythromycin B–6,9-hemiketal (NMR spectrum identical with that of the sample as obtained in Example III above). Subsequent fractions contained 11-O-methyl erythromycin B (401 mg.) which was further purified by chromatography on Sephadex LH–20 in chloroform-hexane 1:1 to give 213 mg. of product.

The product analyzed as follows:

Analysis calculated for: $C_{38}H_{69}NO_{12}$

| Microanalysis | Theory | Found |
|---|---|---|
| C | 62.4 | 62.6 |
| H | 9.5 | 9.7 |
| N | 1.9 | 1.8 |
| O | 26.2 | 26.2 |

Example V

11-O-n-Butyl erythromycin B

4''-O-Formyl erythromycin B (2.7 g.) in tetramethylenesulfoxide (25 ml.) and acetic anhydride (10 ml.) was allowed to stand at room temperature for 18 hours. The mixture was poured into ice cold sodium bicarbonate solution (1 l., 5%) and extracted with chloroform (2×100 ml.). The combined extracts were washed with water and concentrated under vacuum. The concentrate was passed down a column of Sephadex LH–20 in chloroform-hexane 1:1. Initial fractions were concentrated and allowed to stand in methanol for one week. Methanol was removed and the residue was passed down a column of Sephadex LH–20 in chloroform-hexane 1:1. Initial fractions were concentrated and treated with Raney Nickel (ca. 30 g.) in ethanol (100 ml.) under reflux for ninety minutes. The mixture was cooled and filtered through a pad of celite. The filtrate was concentrated and passed down a column of Sephadex LH–20 in chloroform-hexane 1:1. Later fractions were concentrated to give 11-O-n-butyl erythromycin B. Mass spectrum m/e 773.

Analysis calculated for: $C_{41}H_{75}NO_{12}$

| Microanalysis | Theory | Found |
|---|---|---|
| C | 63.6 | 63.7 |
| H | 9.8 | 10.0 |
| N | 1.8 | 1.8 |
| O | 24.8 | 25.2 |

The compounds were then tested for their activity against gram-positive and gram-negative bacteria in an agar dilution test. Results are given in MIC values (minimum inhibitory concentrations) expressed in micrograms/ml. as follows:

where R is selected from the group consisting of lower alkyl, $CH_2SCH_3$ $CH_3SCH_2$, $CH_3CH_2CH_2CH_2$ and —$CHR_3SR_4$ where $R_3$ and $R_4$ are lower alkyl, and $R_1$ and $R_2$ are hydrogen or lower alkanoyl and;

Formula II

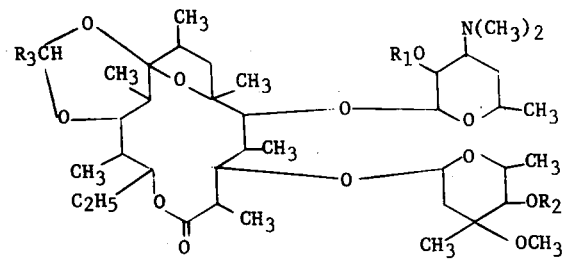

where $R_1$, $R_2$ and $R_3$ are as before defined.

2. The derivative of claim 1 wherein R is methyl, and $R_1$ and $R_2$ are hydrogen in Formula I.

3. The derivative of claim 1 wherein $R_1$ is

TABLE I

| | MIC (in Mcg/ml) | | | | |
|---|---|---|---|---|---|
| Organism | Ex. I | Ex. II | Ex. III | Ex. IV | Ex. V |
| Staphylococcus aureus ATCC 6438P | — | — | — | — | 1.56 |
| Staphylococcus aureus 9144 | 50 | 1.56 | 0.78 | 0.78 | — |
| Staphylococcus aureus Smith | 25 | 0.78 | 0.78 | 0.78 | — |
| Staphylococcus aureus Smith ER | >100 | >100 | >100 | >100 | — |
| Staphylococcus aureus Quinones | >100 | >100 | 50 | >100 | — |
| Staphylococcus aureus Wise 155 | >100 | >100 | 50 | >100 | — |
| Streptococcus faecalis 10541 | 6.2 | 0.2 | 0.2 | 0.39 | 0.78 |
| Escherichia coli Juhl | >100 | >100 | >100 | >100 | — |
| Klebsiella pneumoniae 10031 | >100 | 25 | 12.5 | 12.5 | 100 |
| Proteus vulgaris Abbott JJ | >100 | >100 | >100 | >100 | — |
| Proteus mirabilis Finland No. 9 | >100 | >100 | >100 | >100 | — |
| Salmonella typhimurium Ed No. 9 | >100 | >100 | >100 | >100 | — |
| Shigella sonnei 9290 | — | >100 | 50 | 100 | — |
| Pseudomonas aeruginosa BMH No.10 | >100 | >100 | >100 | >100 | 100 |
| Streptococcus pyogenes Roper | >100 | >100 | 50 | >100 | — |
| Haemophilus influenzae 9334 | >100 | 25 | 50 | 50 | — |
| Haemophilus influenzae Brimm CSF | — | — | 50 | 25 | — |
| Haemophilus influenzae Ill. | — | — | 25 | 25 | — |
| Haemophilus influenzae Patterson | — | — | 25 | 12.5 | — |
| Haemophilus influenzae Shemwell | — | — | 25 | 12.5 | — |
| Haemophilus influenzae Terry | — | — | 25 | 12.5 | — |
| Bacillus subtilis No. 10707 (U. of Ill.) | — | — | — | — | 1.56 |

We claim:

1. An 11-substituted erythromycin B derivative selected from the group consisting of:

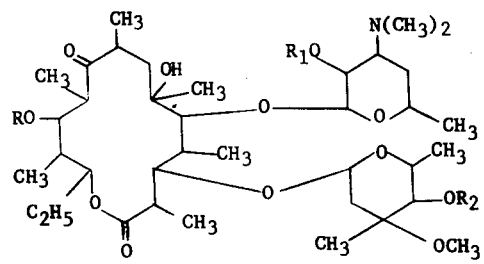

and $R_2$ is $$\underset{CH-}{\overset{O}{\underset{\|}{}}}$$

in Formula I.

4. The derivative of claim 1 wherein $R_1$ and $R_2$ are hydrogen in Formula I.

5. The derivative of claim 1 where $R_1$, $R_2$ and $R_3$ are hydrogen in Formula II.

* * * * *